Jan. 18, 1949.    V. RUSSELL    2,459,341
FLUX METER
Filed Aug. 13, 1945    2 Sheets-Sheet 1
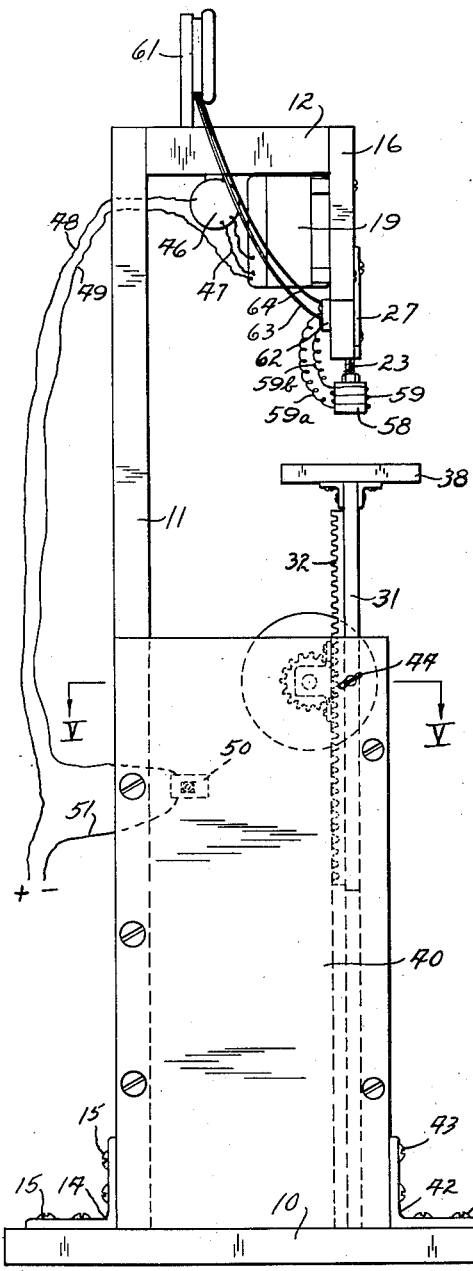
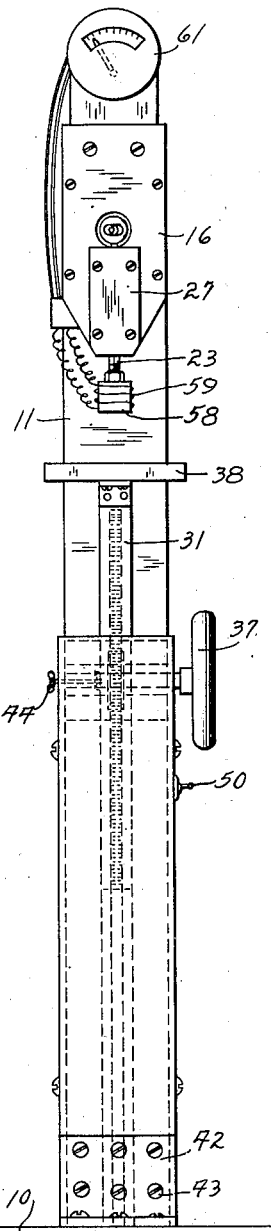
Inventor
Valoran Russell Jan. 18, 1949. V. RUSSELL 2,459,341
FLUX METER
Filed Aug. 13, 1945 2 Sheets-Sheet 2
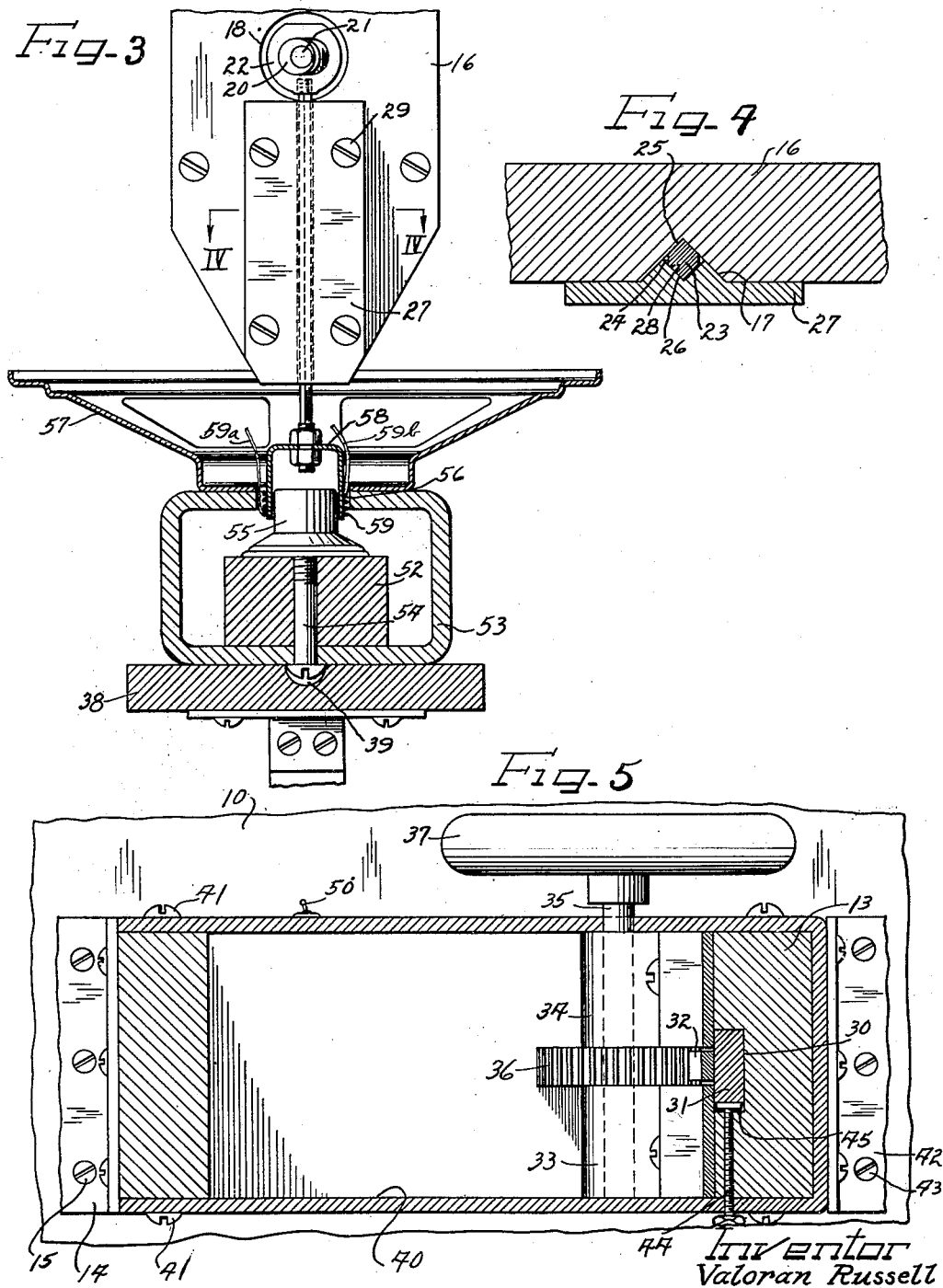

Patented Jan. 18, 1949

2,459,341

UNITED STATES PATENT OFFICE 2,459,341

FLUXMETER

Valoran Russell, Morton Grove, Ill.

Application August 13, 1945, Serial No. 610,610

7 Claims. (Cl. 175—183)

The present invention relates to a flux meter and more particularly to a means for and a method of indicating the relative strength of a permanent magnet.

An object of the present invention is to provide a simple and effective means for determining the magnetic flux produced in a non-magnetic gap by a permanent magnet.

Another object of the invention is to provide a method of determining the magnetic energy of permanent magnets.

A further object of the present invention is to provide a novel testing apparatus for determining the magnetic flux produced by a permanent magnet in the air gap of a radio loud speaker in which the relatively movable parts are held against accidental displacement during a test.

The present invention will herein be described as means for and method of indicating the flux density established in the air gap of a permanent magnet speaker, although the invention is not to be limited to such.

Generally speaking, the invention contemplates the reciprocation or straight line oscillation of a coil having a known stroke and known speed in the air gap of a permanent magnet, and measuring the current developed in the coil.

An embodiment of the invention is illustrated in the accompanying drawings and the views thereof are as follows:

Figure 1 is a side elevational view of an apparatus for practicing the invention;

Figure 2 is a front elevational view of the apparatus;

Figure 3 is a front view of a part of the apparatus showing guide plates and in section a speaker unit, together with a table for supporting the unit while undergoing tests;

Figure 4 is a fragmental enlarged sectional view taken in the plane of line IV—IV of Figure 3; and Figure 5 is an enlarged section taken in the plane of line V—V of Figure 1.

The drawings will now be explained.

Referring to Figures 1 and 2, 10 designates a base from which rises a rear post 11 having a head formed by a forwardly projecting part 12. The post 11 is fastened to the base by suitable brackets 14 through which screws 15 pass for engaging the post and the base. Fastened to the front end of the member 12 is a downwardly extending plate 16, of metal, shown, in Figure 4, as having a V groove 17 formed in its front face. Above the groove the plate has an aperture 18, the groove extending from the aperture 18 to the lower margin of the plate.

Mounted on the head and attached to the member 12 is a constant speed electric motor 19 the shaft of which carries an eccentric 20 movable within the aperture 18 of the plate. The motor shaft is designated as 21.

Within the aperture is a yoke 22 within which the eccentric 20 works to oscillate the yoke in a vertical direction. A rod 23 has its upper end secured to the yoke 22. The rod is square in cross section with two opposite margins 24 milled flat, leaving two opposite square edges 25 and 26. The rod rests in the groove 17 with its edge 25 against the bottom of the groove. A cover plate 27 is formed with a V groove 28 on its inner surface which receives the edge 26 of the rod when the plate is fastened against the face of plate 16, as is shown in Figures 3 and 4. The grooves in the plates 16 and 27 provide a guideway for the rod which permits endwise reciprocation but which prevents any tendency to turn or rotate. The plate 27 is fastened in place by screws 29 threaded into the plate 16.

A front post 13 rises from the base 10 but is shorter than the rear post 11. The post 13 is provided with a guideway 30, vertically disposed, for a rack bar 31 carrying a rack 32. Journaled in bearings 33 and 34 carried by the post 13 is a pinion shaft 35 carrying a pinion 36 enmeshed with the rack 32. A handwheel 37 is fastened to an end of the shaft 35 for rotating the pinion to move the rack. The upper end of the rack bar 31 carries a table 38 in the center of which is a depression 39, for a purpose to be later explained.

The post and pinion are shown as arranged within a U-shaped casing body the lower end of which rests on the base 10 and the margins of which are fastened to the rear post 11 by screws 41. An angle bracket 42 fastens the casing 40 to the base 10 and post 13 by screws 43.

Inasmuch as the rack bar should be held in selected positions while a magnet is being tested, a friction brake means is provided. The brake means here illustrated includes a screw 44 threaded through the wall of the casing 40 and carrying a shoe 45 which bears against the rack bar 31. By moving the screw inwardly the shoe will engage the bar to frictionally hold the bar with a selected degree of resistance so that the bar may be raised or lowered, by positive manipulation of the handwheel 37, but will not fall when the handwheel is released.

While the screw 44 is illustrated as having a head slotted for a screw driver, it is to be understood that it would be possible to supply a head such as a wing so that the screw may be quickly adjusted.

Attached to the head member 12 is a condenser 46 from which wires 47 lead to the motor 19. A line wire 48 leads from the condenser to one side of the electrical supply circuit. A wire 49 leads from the motor 19 to a motor control switch 50, which is mounted on the casing 40. A wire 51 leads from the switch 50 to the other side of the supply line. The switch 50 is a snap toggle switch to open and close the line circuit to the motor 19.

The radio speaker unit to be tested, as shown in Figure 3, includes a permanent magnet 52 fastened to a keeper or yoke 53 by means of a bolt 54. This yoke 53 provides a return flux path for the permanent magnet 52. The bolt 54 secures a soft iron core or post 55 to the upper end of the permanent magnet so that the post will lie within the air gap 56 formed in the yoke 53. Thus the post 55 also forms part of the flux path and, together with the yoke 53, causes substantially all of the mmf. drop to occur across the gap. The basket or diaphragm support 57 is fastened to the yoke as by spot welding.

In the finished speaker unit a voice coil (not shown) is carried by a diaphragm (not shown) spanning the mouth of the basket 57. This voice coil surrounds the post 55 in the gap 56 of the keeper 53 in spaced relation to the post and keeper. The coil is energized by an amplifier circuit and acts as a motor to vibrate the diaphragm.

In the testing of the speaker unit according to this invention, an inverted cup 58 is carried by the rod 23. This cup has a coil 59 of wire wound therearound. The terminal ends 59a and 59b of the coil 59 hug the cup so that they will not contact the keeper or post.

Mounted on the head 12 is a meter 61 which may be a voltmeter. Attached to the rear face of the plate 16 is a terminal block 62 from which wires 63 and 64 lead to the voltmeter 61. The terminal ends 59a and 59b of coil 59 are connected respectively to the wires 63 and 64 on the terminal block.

To place a speaker unit on the table 38 for test, the handwheel 37 is rotated manually to lower the table. A speaker unit is then placed on the table with the head of the bolt 54 in the recess 39 of the table, thus centering the unit. The handwheel 37 is then reversely rotated to raise the table until the cup is entered in the air gap 56 of the keeper, in the position shown in Figure 3. The friction brake effect on the bar 31 will hold the table in selected position and the operator manipulates motor switch 50 whereupon the constant speed motor reciprocates or oscillates the rod 23 and with it the cup 58 and coil 59 which movement of the cup drives the coil to act as a generator cutting the lines of force in the air gap and generating a current in the coil which current is then carried by the conductors 59a and 59b to the terminal block 62 and to the voltmeter 61 where an exact reading may be had of the voltage generated in the magnet by the reciprocation or oscillation of the voice coil.

It will be noted that to make this test, a replica of a speaker voice coil is operated as a generator to induce an E. M. F. which can be indicated in the meter. Since the speed and stroke of the coil is known and constant, the generated voltage gives a very accurate indication of the relative flux density in the air gap of the speaker.

When the speaker unit is completely assembled and installed in a radio set, the voice coil receives its current from the radio set, thus causing it to act as a motor for vibrating the diaphragm.

The method of the present invention contemplates the reciprocation or oscillation of the voice coil as a generator moving it through the lines of force in the air gap thus setting up a current which can be read exactly on the meter.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

I claim as my invention:

1. In apparatus for determining the flux density in the air gap of a permanent magnet speaker comprising means for supporting a permanent magnet speaker with its diaphragm and voice coil removed, means simulating the removed voice coil, means for linearly vibrating said simulating means in the air gap of said speaker through a substantially constant stroke and at a substantially constant frequency, and means responsive to the effective value of the induced voltage in said simulating means for indicating the relative flux density in said air gap.

2. Apparatus for measuring the effective magnetic energy of a permanent magnet speaker comprising means for supporting the yoke and magnet of a permanent magnet speaker in their normal relationship, a coil mounted for reciprocation substantially at right angles to the plane of its own face and in the air gap between said yoke and magnet, means for reciprocating said coil at substantially a constant rate and with substantially a constant stroke, and means for measuring the electromotive force induced in said coil, the intensity of said electromotive force so induced being a function of the effective magnetic energy of said speaker.

3. In an apparatus for testing the effectiveness of the permanent magnet of a speaker unit, a base, an upright frame having a head supporting a substantially constant speed motor and a vertically reciprocable rod, guide means for said rod, said guide means and rod having cooperating parts for allowing reciprocable movement of the rod but preventing rotation of it, a voice coil on said rod, a driving connection between said motor and said rod arranged to reciprocate said rod through a substantially constant stroke a vertically adjustable table for receiving and supporting a speaker unit for test, means for vertically adjusting the table, means for locking the table in adjusted position during test, means for operating the motor to vibrate the voice coil as a generator, and a meter for indicating the current developed by the vibration of the coil.

4. In an apparatus of the class described, a constant speed motor, a rod linearly reciprocable by the motor shaft through a substantially constant stroke, a coil on said rod simulating the voice coil of a dynamic speaker, a dynamic speaker unit with its voice coil removed mounted to receive said first coil in its magnetic circuit air gap, and a meter electrically connected to said first coil to indicate the effective value of the voltage induced in said first coil by reciprocation thereof.

5. In an apparatus of the class described, a base, an upright post thereon having a head overlying the base, said head supporting a vertical plate with an aperture in it and a vertical V-groove extending down from said aperture to the lower margin of the plate, a constant speed motor supported by said head with its shaft extending into said aperture, an eccentric on said shaft, a yoke about said eccentric to be reciprocated thereby, a rod connected at its upper end to said yoke and having two oppositely disposed edges arranged with one edge in said V-groove, a cover plate having a vertical V-groove in it against said plate and overlying the rod and receiving the other rod edge in its groove, a voice coil connected to the lower end of said rod, a table below said head to support a speaker unit for test, a speaker unit on said table movable thereby to position the air gap in its keeper about said voice coil, means for vertically moving said table, means for locking said table in adjusted position, a switch for said motor, and a meter electrically connected to the voice coil winding to indicate the current developed as the voice coil is reciprocated by said motor.

6. In an apparatus of the class described, including a base, a rear post rising from the base and having a head overhanging the base, a front post, a rack vertically reciprocable in said front post, a table on said rack, a pinion for moving said rack, a handwheel for operating said pinion, a brake for holding said rack bar against movement, said head carrying a substantially constant speed motor and a vertically reciprocable rod, a driving connection between said motor and said rod arranged to reciprocate said rod through a substantially constant stroke means guiding said rod to prevent rotative movement thereof, said table being lowered to receive a speaker unit on it and raised to bring the air gap of the speaker about said voice coil, and means for indicating the current developed by reciprocation of said voice coil in said air gap.

7. In an apparatus of the class described, a base, a post rising from the base and having a head overlying the base, a substantially constant speed motor supported by said head, a vertically reciprocable rod supported and guided in said head, an eccentric connected to one end of said rod, said motor having its shaft connected for driving the eccentric, means guiding said rod in straight line reciprocable movement while preventing rotative movement thereof, a voice coil connected to the other end of the rod, means for moving a dynamic speaker unit in the direction of length of the rod to position the magnetic circuit air gap thereof to receive said coil, means centering said speaker unit on said moving means, means for locking said moving means in adjusted position, means for operating the motor to reciprocate the coil, and a meter electrically connected to the coil winding to indicate the voltage induced in said coil by the reciprocation thereof.

VALORAN RUSSELL.

REFERENCES CITED

The following references are of record in the file of this patent:

UNITED STATES PATENTS

| Number | Name | Date |
|---|---|---|
| 1,270,100 | Ballman | June 18, 1919 |
| 1,662,433 | Murray | Mar. 13, 1928 |
| 2,135,843 | Pye | Nov. 8, 1938 |
| 2,231,085 | Morrison et al. | Feb. 11, 1941 |
| 2,231,810 | Kamenarovic | Feb. 11, 1941 |
| 2,382,743 | Penther et al. | Aug. 14, 1945 |